United States Patent
Pisklak et al.

(10) Patent No.: US 11,981,858 B2
(45) Date of Patent: May 14, 2024

(54) GRAPHENE FLUID UTILIZED TO SUSPEND PARTICULATES

(71) Applicant: Halliburton Energy Services, Inc., Houston, TX (US)

(72) Inventors: Thomas Jason Pisklak, Houston, TX (US); Samuel J. Lewis, Houston, TX (US); Claudia Pineda, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 17/892,775

(22) Filed: Aug. 22, 2022

(65) Prior Publication Data

US 2024/0059952 A1 Feb. 22, 2024

(51) Int. Cl.
*E21B 43/16* (2006.01)
*C09K 8/467* (2006.01)

(52) U.S. Cl.
CPC ..................... *C09K 8/467* (2013.01)

(58) Field of Classification Search
CPC ............... C09K 8/467; E21B 43/16
USPC ................................................. 166/292
See application file for complete search history.

(56) References Cited

U.S. PATENT DOCUMENTS

| | | | |
|---|---|---|---|
| 2012/0015852 A1 | 1/2012 | Quintero et al. | |
| 2012/0245058 A1* | 9/2012 | Monteiro | C09K 8/032 507/131 |
| 2013/0341028 A1 | 12/2013 | Christian et al. | |
| 2014/0134092 A1 | 5/2014 | Shankman | |
| 2015/0108391 A1 | 4/2015 | Tour et al. | |
| 2015/0152314 A1* | 6/2015 | Muthusamy | C04B 28/02 106/781 |
| 2015/0275067 A1 | 10/2015 | Kabbani et al. | |
| 2017/0327729 A1 | 11/2017 | Salla et al. | |
| 2018/0282214 A1 | 10/2018 | Xiang et al. | |
| 2019/0144280 A1* | 5/2019 | Opoku | C01B 32/15 423/461 |
| 2020/0056086 A1 | 2/2020 | Haq et al. | |
| 2020/0308469 A1 | 10/2020 | Taleghani et al. | |
| 2021/0061661 A1 | 3/2021 | Opoku | |
| 2021/0238040 A1* | 8/2021 | Opoku | C01B 32/15 |

(Continued)

FOREIGN PATENT DOCUMENTS

| | | |
|---|---|---|
| CN | 104891479 A | 5/2015 |
| CN | 109133806 A | 1/2019 |
| CN | 111116081 B | 3/2021 |

(Continued)

OTHER PUBLICATIONS

Filing Receipt, Specification and Drawings for U.S. Appl. No. 17/892,781, filed Aug. 22, 2022, entitled "Use of Graphene as a Cement Retarder," 43 pages.

(Continued)

*Primary Examiner* — Zakiya W Bates
*Assistant Examiner* — Ashish K Varma
(74) *Attorney, Agent, or Firm* — Conley Rose, P.C.; Rodney B. Carroll

(57) ABSTRACT

A composition including a particulate, water, and a suspension aid comprising graphene, wherein the graphene comprises bioderived renewable graphene (BRG) and wherein the particulate is suspended in the composition. Methods of making and using the composition are also provided.

20 Claims, 3 Drawing Sheets

(56) References Cited

U.S. PATENT DOCUMENTS

2022/0234955 A1  7/2022  Masotti

FOREIGN PATENT DOCUMENTS

| WO | 2015084438 A1 | 6/2015 |
| WO | 2021076667 A1 | 4/2021 |

OTHER PUBLICATIONS

Filing Receipt, Specification and Drawings for U.S. Appl. No. 17/892,787, filed Aug. 22, 2022, entitled "Mitigation of Transient Gels in Cements," 41 pages.

Filing Receipt, Specification and Drawings for U.S. Appl. No. 17/892,790, filed Aug. 22, 2022, entitled "Use of Graphene to Enhance Stability and Density Control of Cement Slurriess," 40 pages.

First Office Action dated Mar. 23, 2023 (17 pages), U.S. Appl. No. 17/892,781, filed Aug. 22, 2022.

First Office Action dated Jun. 13, 2023 (24 pages), U.S. Appl. No. 17/892,787, filed Aug. 22, 2022.

Ikram, Rabia et al., "Utilization of eco-friendly waste generated nanomaterials in water-based drilling fluids; state of the art review", Materials, Jul. 27, 2021 (Publication date), vol. 14, Article No. 4171, Internal pp. 1-28.

Foreign Communication from Related Application—International Search Report and Written Opinion of the International Searching Authority, International Application No. PCT/US2023/024519, dated Sep. 25, 2023, 9 pages.

Zhi Ge et al., "The Effect of the Addition of Graphene Nanoplatelets on the Selected Properties of Cementitious Composites", Frontiers in Built Environment, pp. 1-10 2021, vol. 7, Article No. 673346.

Rhee, I. et al., "Compressive Strength Sensitivity of Cement Mortar Using Rice Husk-Derived Graphene With a High Specific Surface Area", Construction and Building Materials, 2015, vol. 96, pp. 189-197.

Alkhamis, M. et al., "New Cement Formulations Utilizing Graphene Nano Platelets to Improve CementProperties and Long-Term Reliability in Oil Wells", SPE Kingdom of Saudi Technical Symposium and Exhibition, 2018, SPE-192342-MS, pp. 1-17.

Foreign Communication from Related Application—International Search Report and Written Opinion of the International Searching Authority, International Application No. PCT/US2023/023473, dated Sep. 12, 2023, 10 pages.

Foreign Communication from Related Application—International Search Report and Written Opinion of the International Searching Authority, International Application No. PCT/US2023/024521, dated Sep. 19, 2023, 9 pages.

Final Office Action dated Sep. 21, 2023 (23 pages), U.S. Appl. No. 17/892,787, filed Aug. 22, 2022.

* cited by examiner

GRAPHENE FLUID UTILIZED TO SUSPEND PARTICULATES

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present disclosure relates generally to compositions having particulates suspended therein. More specifically, the present disclosure relates to systems and methods of suspending particulates in compositions. Still more specifically, the present disclosure relates to systems and methods for suspending particulates in compositions via the use of graphene as a suspension aid.

BACKGROUND

In oilfield applications, a key factor in a cement slurry is the compressive strength, or how strong the hardened cement sheath is. Strength retrogression can occur when a hardened cement begins to lose its strength. Another issue is the need to supply cement particulate additives (e.g., weighting agents, silica, WellLife™ elastomeric additives available from Halliburton Energy Services, etc.) in liquid form, specifically for offshore usage. Non-oil and gas applications also often call for compositions comprising suspensions of particulates.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5(a) shows the expected result of settling, while FIG. 5(b) depicts the unexpectedly observed result obtained with a composition of this disclosure.

DETAILED DESCRIPTION

Figure 1:
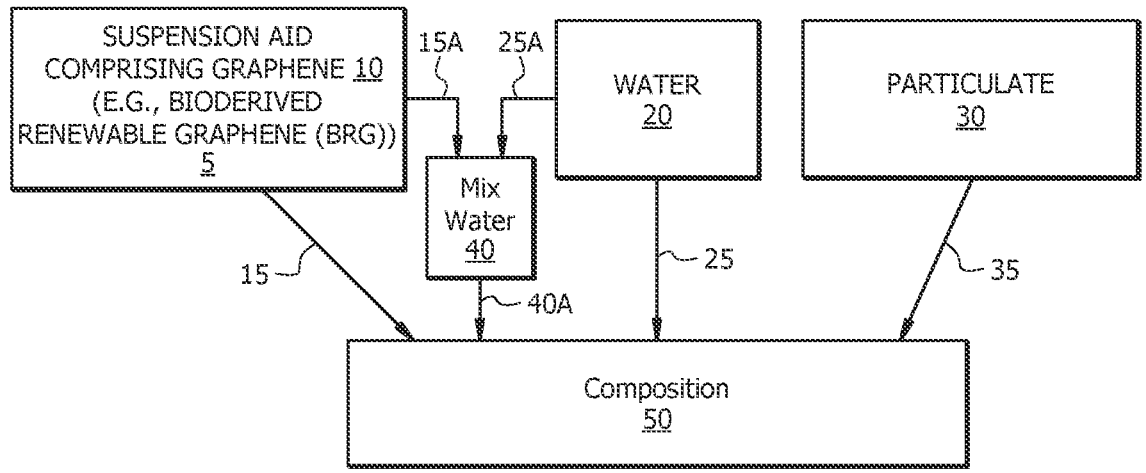
FIG. 1 is a schematic of a composition, according to embodiments of this disclosure.

It should be understood at the outset that although an illustrative implementation of one or more embodiments are provided below, the disclosed systems and/or methods can be implemented using any number of techniques, whether currently known or in existence. The disclosure should in no way be limited to the illustrative implementations, drawings, and techniques below, including the exemplary designs and implementations illustrated and described herein, but can be modified within the scope of the appended claims along with their full scope of equivalents.

As utilized herein, the phrase "percent by weight of water", abbreviated "% bwow", indicates the amount of additive material divided by the weight of water multiplied by 100 and the phrase. "percent by weight of the composition" or "percent by weight of cement", abbreviated "% bwoc", indicates the amount of additive material divided by the weight of cementitious material multiplied by 100.

As utilized herein, bioderived renewable graphene (BRG) is a biorenewable resource that can be renewed via biological means and produced by biological organisms.

As noted above, in oilfield applications, a key factor in a cement slurry is the compressive strength, or how strong the hardened cement sheath is. Strength retrogression can occur when a hardened cement begins to lose its strength. Another issue is the need to supply cement particulate additives (e.g., weighting agents, silica. WellLife, etc.) in liquid form, specifically for offshore usage.

It has been unexpectedly discovered that graphene (e.g., graphene nano-platelets made from the cassava plant) can function as a suspension aid to suspend solid particulates in water. The suspension properties of graphene can be utilized according to this disclosure to formulate 'liquid strength retrogression mitigation' agents, among other things. A composition comprising suspended particulates can be formulated, as per this disclosure, by the addition of small amounts of graphene to water along with a particulate, such as, without limitation, crystalline or amorphous silica. Furthermore, the suspension properties of graphene in water can be exploited to provide compositions of this disclosure comprising liquid suspensions of other types of materials, such as, without limitation, weighting agents, WellLife additives. Boosts, etc. Such compositions can thus be useful to provide a variety of solid particulates in suspended form in oil and gas and non-oil and gas applications.

As a secondary, synergistic effect, utilizing graphene as the suspension aid in the compositions, as described herein, can provide mechanical property enhancement to the compositions (e.g., cement slurry compositions) in which the liquid additives are utilized, due to mechanical property modification provided by graphene, as described herein.

Disclosed herein are compositions comprising particulates suspended therein via a suspension aid comprising graphene, and methods for making and using such compositions. In embodiments, a composition of this disclosure can comprise: a particulate material (also referred to herein as "particulates"); water; and a suspension aid comprising graphene, wherein the particulate is suspended in the composition.

Figure 2:
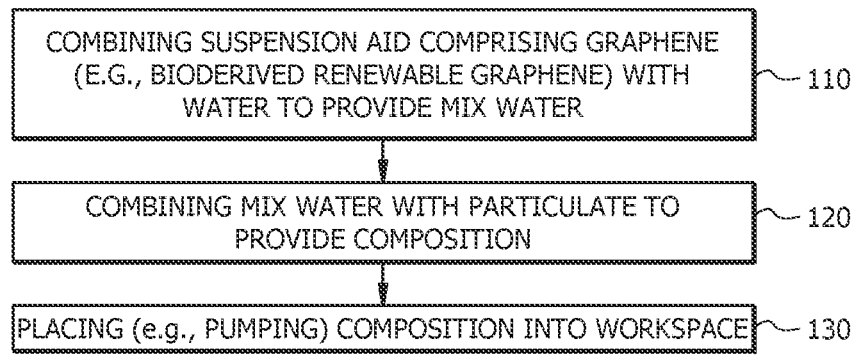
FIG. 2 is a schematic flow diagram of a method, according to embodiments of this disclosure.
Figure 3:
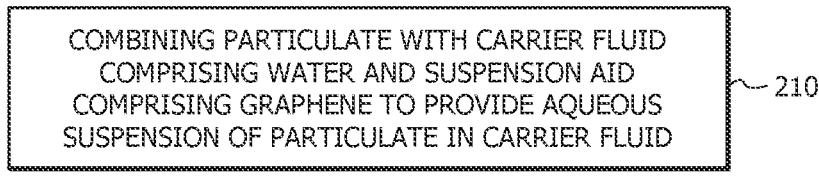
FIG. 3 is a schematic flow diagram of a method, according to embodiments of this disclosure.

The compositions of this disclosure, and methods of making and using same, will now be described with reference to FIG. 1, which is a schematic of a composition 50 (also referred to herein as a "liquid particulate suspension" or simply "suspension" 50), according to embodiments of this disclosure; FIG. 2, which is a schematic flow diagram of a method 100 of making such a composition 50, according to embodiments of this disclosure; and FIG. 3, which is a schematic flow diagram of a method 200 of suspending particulates, according to embodiments of this disclosure.

With reference to FIG. 1, a composition 50 of this disclosure comprises suspension aid 5 comprising graphene 10, water 20 (also referred to as "aqueous base fluid" 20), and particulates 30 (also referred to as "particulate material" or simply "particulate" 30). Graphene 10 assists in suspending the particulates 30, which are suspended in the composition 50.

In embodiments, the graphene 10 does not comprise or does not consist of a synthetic graphene. According to embodiments of this disclosure, the graphene 10 can comprise bioderived renewable graphene (BRG). The composition 50 can comprise from about 0.01 to about 20, from about 0.1 to about 15, from about 0.5 to about 5, or greater than or equal to about 0, 0.1, 0.5, 1, 2, 3, 4, 5, 6, 7, 8, 9, 10 or 15, and/or and less than or equal to about 20, 19, 18, 17, 16, 15, 10, or 5 percent graphene 10 (e.g., BRG) by weight of the composition 50 (% graphene bwoc).

In embodiments, the BRG comprises graphene 10 derived from a plant. In embodiments, the BRG comprises graphene 10 derived from a carbohydrate. For example, in embodiments, the carbohydrate comprises cassava (e.g., cassava root), corn (e.g., corn grain, corn flour), sugar cane (e.g., sucrose), and/or rice (e.g., rice grain), and the graphene 10 comprises graphene derived from cassava, corn, and/or rice. The BRG can comprise graphene with a fused sheet-like morphology (e.g., graphene nanosheets, referred to herein as "nanosheets"). Sheet-like indicates stratified, deposited, or arranged in horizontal layers. For example, such BRG derived from cassava and comprising graphene nanosheets is described in U.S. Patent Publication No. 2021/0061661, U.S. Patent Publication No. 2021/0238040, and U.S. Patent Publication No. 2019/0144280, the disclosure of each of which is hereby incorporated herein in its entirety for purposes not contrary to this disclosure. In embodiments, the graphene 10 comprises BRG such as described in the aforementioned patent applications and/or obtained from SurgePower Materials, Inc., New Braunfels, TX.

In embodiments, graphene 10 comprises a carbon nanosheet with distinct properties that can be produced from a renewable carbonaceous raw materials such as, without limitation, cassava root extract, corn flour, rice grain, wheat flour, yam root extract, potatoes root extract, sugar beet roots extract and sucrose (generally referred to herein as carbohydrates). The process for making carbon nanosheet from these carbohydrates can be as follows.

First, the aforementioned carbohydrate can be placed in a solvent, such as a solvent containing water or ethylene glycol or ethanol, to aid hydrolysis. This can be followed by gradual removing of glycosidic linkages in the carbohydrate via chemical and/or thermal activation. This pre-treatment step causes formation of intermediate fused carbon material, which contains limited amount of glycosidic bonds, hydroxyl and carbonyl groups. Chemicals that can be effective include, without limitation, sodium hydroxide, hydrochloric acid, phosphoric acid, phosphorous acid, and nitric acid. In addition, catalyst such as yeast, aluminum-nickel alloy, cobalt, $B_2H_6$, zinc, and copper can be employed.

The mixture of carbonaceous material and chemical and/or catalyst can be exposed to approximately 45 to 1050° C., in air or inert atmosphere to aid formation of a fused carbon network with a sheet-like morphology, referred to herein as an intermediate carbon material.

Another step can include thermochemical activation of the intermediate carbon based material to initiate chemical bonding of carbon atoms to form a hexagonal planar network of mainly sp2 hybridization carbons. This occurs by at least switching oxygen atom and releasing hydroxyl portion of said intermediate carbon material to result in a short range or long range of aromatic ring structure or a mixture of both within the sheet that is retained and other groups or molecules are released. This step can be performed at temperature in the range of 500 to 1500° C. in an inert gas containing hydrogen gas, in embodiments, and can result in a network of high surface area and pore volume sp2 bonded carbon nanosheet.

The resulting carbon nanosheet powders can be washed with up to 10 volume percent hydrochloric acid (HCl) to remove any remaining precursors and catalyst in the final product, and can be followed by heat treatment at 700 to 1500° C., for example in inert atmosphere.

Alternatively or additionally, the step of treating the intermediate carbon product to form mainly sp2 hybridization carbons can be accomplished via chemical process. Such process can include, without limitation, treating the intermediate carbon product with a chemical, such as a chemical chosen from the group of hydrazine. $LiAlH_4$, $B_2H_6$, and/or $NaBH_4$; in embodiments, hydrazine, and in other embodiments $NaBH_4$.

As mentioned above, the process of producing carbon nanosheets can begin with a renewable carbonaceous raw material, such as cassava root extract, corn flour, rice grain, wheat flour, or sucrose. These renewable carbonaceous materials contain a high content of carbohydrates on a water free basis, typically more than 70% by weight. The renewable carbonaceous material can contain various percentages of glucose, and fructose bonded together by glycosidic linkages to form polymeric units such as amylase and amylopectin. Although the molecular formula for glucose and fructose are the same, thus ($C_6H_{23}O_6$), they have different molecular structures.

In order to obtain a carbon nanosheet, each carbohydrate unit can be pre-treated with a dehydration solution, for example containing at least 1% of acid or catalyst. The pretreatment can result in an intermediate carbon material with dark-grey color made up of fused sheet-like morphology.

The mechanism can unfold in two stages. First, the treatment of the carbohydrate via chemical and/or thermal activation can result in hydrolysis and removal of the glycosidic linkages in the polymeric carbohydrate unit to form individual glucose and fructose units. This can be followed by a second mechanism to remove water molecules from each of glucose or fructose units by a dehydration solution. The pretreatment can be accomplished by gradual heating of the carbohydrate and hydration solution, for example at 45 to 1050° C., preferably 80° C. e.g., for up to 36 hours or more. In the process, the carbon atoms can rearrange to form a ring with neighboring carbon atoms. The hydration solution can cause intercalation of the layers of carbon after ring formation, thus giving rise to a layered structure.

The intermediate carbon product can undergo a second treatment to exfoliate the intercalated carbon layers. Several thermal and/or chemical methods can be used to exfoliate the carbon sheet. Thermal methods include direct heating of the intermediate carbon material. Radiant heating in a resistive furnace, or on top of a hotplate, laser irradiation and microwave irradiation can be effective for exfoliating carbon nanosheet and removal of water molecules to form mainly sp2 bonded carbon nanosheets.

Thermal exfoliation via microwave heating can remove substantial amount of $H_2O$ molecules from the intermediate carbon materials, with a reduction in oxygen content from the intermediate carbon materials, for example from 39.5 to 14.6 weight percent.

Exfoliated carbon nanosheets can be washed (e.g., with a 10 volume percent HCl) to remove remaining hydration solution and/or catalyst compounds. Subsequently, the resulting product can be washed with de-ionized water one or several times, for example until the pH is about 7. The resulting material can be thermally treated at high temperature in inert atmosphere to remove any groups attached to the nanosheet and terminate the ends with hydrogen. The carbon nanosheets can have a sheet-like morphology, and carbon composition can be up to 90, 91, 92, 93, or 94 weight percent or more.

In an alternate method of producing carbon nanosheets, the carbohydrate can be soaked in dehydration solution, as previously discussed. The mixture can be directly exposed to rapid and uniform high temperature heating immediately after thorough and uniform mixing. This can cause removal of glycosidic bonds and release of water molecules, thereby forcing the resulting intermediate carbon materials to exfoliate into carbon nanosheet. Specifically, heating can be accomplished by microwave irradiation and/or heating in an oven preheated, for example, to at least 500° C. to yield the carbon nanosheet.

In other embodiments, after thorough and uniform mixing of said carbohydrate and dehydration solution (e.g., containing excess deionized water), this mixture can be slowly heated to temperature below 100° C., and held there a time of for example, less than 24 hours. The mixture can form a dark colored intermediate solution containing carbon. The dark intermediate solution can be coated on a substrate to form thin films. The resulting films can be exposed to high temperatures in inert atmosphere containing, for example, at least 2% by volume hydrogen gas. The films can be slowly heated, for example in the range of 700-1500° C., to form a thin layer of conducting carbon nanosheet on a substrate. The substrate can include, for example, copper foil, silicon wafer, glass slide or a quartz substrate.

In embodiments, a process for forming the nanosheets can comprise providing a renewable carbohydrate source to a reactor comprising a solvent to obtain a soaked or dissolved carbohydrate source; adding a dehydration solution and a catalyst to the reactor comprising the soaked or dissolved carbohydrate source to obtain a reaction mixture, e.g., where the dehydration solution has a hydrogen ions concentration of at least approximately 1%; charging said reactor with air or inert gas; heating the reaction mixture to remove glycosidic linkages and water molecules from the carbohydrate, thereby producing an intermediate mixture with sheet-like morphology; and further heating the intermediate mixture in inert gas to form the carbon nanosheet material. The carbon nanosheet material can be in the form of a powder. The carbohydrate source can comprise yam root extract, potato root extract, cassava root extract, cassava root flour, tapioca flour, dried cassava root pulp, dried and fried cassava root flakes, sugarcane extract, sugar beet root extract, sucrose, rice grain, corn, or wheat grain.

In embodiments, the solvent can be chosen from distilled water, deionized water, ethanol, and ethylene glycol. In embodiments, the dehydration solution can be chosen from sodium hydroxide, hydrochloric acid, phosphoric acid, phosphorous acid, and nitric acid. In embodiments, the process further comprises removing the dehydration solution by washing and diluting with excess distilled or deionized water prior to further heating of the intermediate mixture.

The catalyst can be chosen from platinum, palladium, $LiAlH_4$, nickel, yeast, aluminum-nickel alloy, cobalt, $B_2H_6$, zinc, $NaBH_4$, copper, or combinations thereof. The process can further include removing the catalyst by washing, filtering, magnetic separation, sonication, sieving, and/or centrifugation prior to further heating of the intermediate mixture.

The heating of the reaction mixture can be carried out in air or inert gas, for example at approximately 45 to 1050° C. The process can further include, prior to further heating the intermediate mixture, drying the intermediate mixture to produce an intermediate mixture in form of a powder; wherein the intermediate mixture in form of powder is heated in the inert gas, for example at approximately 500 to 1500° C., to produce the carbon nanosheet material. The inert gas can comprise, for example, argon, helium, or nitrogen, and can optionally further comprise a partial pressure of hydrogen gas. The intermediate mixture can be heated to a temperature of approximately 45 to 1050° C.

The carbon nanosheet material can have a specific surface area of at least 2000, 2100, 2200, 2300, 2400, or 2496 $m^2/g$ and/or a pore volume of at least 3.0, 3.1, 3.2, 3.3, 3.4, 3.5, or 3.6 cc/g. The carbon nanosheet material can have a pore volume of up to 3.0, 4.0, or 5.0 cc/g.

The suspension aid 5 can comprise, consist of or consist essentially of the BRG, in embodiments. The composition 50 can comprise greater than or equal to 5, 10, or 25 percent graphene (e.g., BRG by) weight of water 20 (% BRG bwow).

Water 20 can comprise an aqueous base fluid. An aqueous base fluid 20 can be present in the composition 50 in an amount sufficient to make a slurry which is pumpable for introduction to a desired location in a workspace, for example, down hole, in embodiments. In embodiments, the aqueous base fluid or water 20 comprises fresh water; brackish water; saltwater; or a combination thereof. In embodiments, the water 20 can be present in the composition 50 in an amount of from about 20% to about 80% by weight of the composition ("bwoc"), from about 28% to about 60% bwoc, or from about 36% to about 66% bwoc.

The particulate 30 is not particularly limited, so long as it is insoluble in the water 20. For example, in embodiments, the particulate 30 can comprise sand, a weighting agent, rubber particles, a mechanical property modifier, iron oxide, polymer particles, a cementitious particulate material, such as a pozzolan, glass spheres (e.g., hollow glass spheres), a pozzolanic material, a lost circulation material, another water insoluble particle, or a combination thereof. The particulate density is not particularly limited. In embodiments, the particulate 30 has a density of greater than, equal to, or less than water (e.g., 1 $g/cm^3$). In embodiments, the particulate 30 has an average diameter of less than or equal to about 5000, 500, 50, 5 or 0.5 micrometers.

In embodiments, the slurry composition 50 does not comprise a settable composition (e.g., a composition that cures and becomes hardened when set). In such embodiments, composition 50 can comprise a non-settable composition 50 (e.g., a composition that does not cure and become hardened when set). In such embodiments, composition 50 does not comprise a cement. In alternative embodiments, the particulate material 30 comprises a cementitious particulate material 30 (also referred to herein simply as a "cement" 30), that can comprise a cement powder, such as, without limitation, a Portland cement, and composition 50 can comprise a settable cement slurry composition 50. A variety of cementitious particulate material 30 can be used in a cement slurry composition 50, including cements comprised of calcium, aluminum, silicon, oxygen, and/or sulfur which set and harden by reaction with water. Such hydraulic cements include Portland cements, gypsum cements, high alumina content cements, slag cements, high magnesia content cements, shale cements, acid/base cements, fly ash cements, zeolite cement systems, kiln dust cement systems, microfine cements, metakaolin, pumice and their combinations. In embodiments, cementitious particulate material 30 comprises a Type I, IA, II, IIA, III, IIIA, IV, V, VI, or VII Portland cement, or a combination or subtype thereof, such as, for example, a Type IL (e.g., limestone) cement powder, as defined in the ASTM standard (e.g., ASTM C150). In embodiments, a cementitious particulate material 30 comprises a non-API cement. In embodiments, cementitious particulate material 30 comprises an API cement, such as, for example, an API Portland cement from one of Classes A, B, C, D, E, F, G, H, K, and/or L.

As noted above, in embodiments, composition 50 can comprise a construction grade cement slurry composition 50. According to this disclosure, a construction grade cement is a non-API cement, such as one comprising a cementitious particulate material 30 comprising greater than about 1% by weight of calcium aluminate, C3A. In embodiments, the cementitious particulate material 30 has an aluminate content (e.g., C3A) in a range of from about 1 to about 30, from about 3 to about 20, from about 5 to about 15, or greater than or equal to about 1, 3, or 5 percent aluminate by mass of cementitious material 30.

The composition 50 of this disclosure can contain one or more additives. For example, in embodiments in which composition 50 comprises a cement slurry composition 50, the additives can comprise one or more selected from resins, latex, stabilizers, silica, pozzolans, microspheres, aqueous superabsorbers, viscosifying agents, suspending agents, dispersing agents, salts, accelerants, surfactants, retardants, defoamers, settling-prevention agents, weighting materials, fluid loss control agents, elastomers, vitrified shale, cement kiln dust, gas migration control additives, formation conditioning agents, or combinations thereof. In embodiments, composition 50 comprises no added biocide.

In embodiments, the suspended particulates 30 remain suspended in the composition 50 during free fluid testing (e.g., with little (less than 10, 9, 8, 7, 6, 5, 4, 3, 2, or 1 wt %) or no substantially sediment formation/separation), for example, as measured according to API 10B-2, for at least 60, 120, 150, or 200 minutes. In embodiments, graphene 10 (e.g., BRG) and the particulate 30 remain homogeneously dispersed during the free fluid testing.

The composition can have any suitable density. In embodiments, the composition 50 comprises a cement slurry composition 50, and the cement slurry composition 50 can have a slurry density which is pumpable for introduction down hole. In embodiments, the density of the cement slurry composition 50 is from about 7 pounds per gallon (ppg) to about 20 ppg, from about 10 ppg to about 18 ppg, or from about 13 ppg to about 17 ppg.

A yield point of the composition 50 as measured according to API 10B-2 (e.g., after two hours of quiescent aging at room temperature and pressure) can be reduced by at least 10, 20, 30, 40, or 50% relative to a same composition absent the graphene 10. An apparent viscosity at 100 RPM ($AVIS_{100}$) of the composition 50 as measured, for example, according to API 10B-2 (e.g., after two hours of quiescent aging at room temperature and pressure) can be reduced by at least 10, 20, 30, 40, or 50% relative to the same composition absent the graphene 10. A thixotropic rate of the composition 50, measured as the ten minute yield point (e.g., measured according to API 10B-2) divided by ten can be less than a thixotropic rate of the same composition absent the graphene 10. In embodiments, the thixotropic rate of the composition 50 can be reduced by at least 5, 10, 15, or 20% relative to the thixotropic rate of the same composition absent the graphene 10.

Also provided herein is a method of making a composition 50 comprising suspended particulates 30. The method will now be described with reference to FIG. 2, which is a schematic flow diagram of a method 100, according to embodiments of this disclosure. Method 100 of making the composition 50, comprising suspended particulates 30, comprises, combining the suspension aid 5 comprising graphene 10 and particulate material 30 with water 20 to provide the composition 50. In embodiments, as depicted at 110, suspension aid 5 comprising graphene 10 is combined with water 20 to provide a mix water 40, and, at 120, the mix water 40 is combined with particulate material 30 (e.g., cement powder) to provide the composition 50 (e.g., a cement slurry composition 50) having the particulates 30 suspended therein. Alternatively or additionally, graphene 10 can be otherwise incorporated into composition 50. For example, in embodiments, graphene 10 can be dry blended into composition 50. As depicted in FIG. 2, Method 100 can further include, at 130, placing (e.g., pumping) the composition 50 into a workspace.

As depicted in FIG. 1, line 15, 25, and 35 can be utilized to combine suspension aid 5 comprising graphene 10, water 20, and particulate material 30, respectively, to form composition 50. Alternatively or additionally, lines 15A and 25A can be utilized to combine suspension aid 5 comprising graphene 10 with water 20 to provide mix water 40, and lines 40A and 35 can be utilized to combine the mix water 40 and particulate material 30 to provide the composition 50. The order of combination of the suspension aid 5 comprising graphene 10, water 20, and particulate material 30 to provide the composition 50 can be adjusted, and remain within the scope of this disclosure.

As described hereinabove, the graphene 10 can comprise bioderived renewable graphene (BRG), such as, without limitation, BRG comprising graphene derived from a plant, such as the cassava plant. The BRG can comprise graphene with a fused sheet-like morphology (e.g., graphene nanosheets), such as the graphene 10 described in U.S. Patent Publication No. 2021/0061661, U.S. Patent Publication No. 2021/0238040, and/or U.S. Patent Publication No. 2019/0144280, incorporated hereinabove by reference. Without being limited by theory, BRG can provide enhanced results relative to non-bioderived graphene due to characteristics of the BRG provided by the production thereof.

The composition 50 can be a composition 50 as described hereinabove. For example, the composition 50 can comprise from about 0.01 to about 20, from about 0.1 to about 15, from about 0.5 to about 5, or greater than or equal to about 0, 0.1, or 0.5 and less than or equal to about 20, 15, or 5 percent graphene (e.g., BRG) by weight of the composition 50 (% graphene bwoc). In embodiments, composition 50 comprises greater than or equal to 5, 10, or 25 percent graphene (e.g., BRG) by weight of water (% graphene (e.g., BRG) bwow).

The particulate 30 can be a particulate 30 as described hereinabove. For example, in embodiments, particulate 30 comprises sand, a weighting agent, rubber particles, a mechanical property modifier, iron oxide, polymer particles, glass spheres (e.g., hollow glass spheres), a pozzolanic material, a lost circulation material, another water insoluble particle, or a combination thereof. The particulate 30 can have a density of greater than or less than water (e.g., 1 g/cm$^3$), in embodiments. The particulate 30 can, in embodiments, have an average diameter of less than or equal to about 5000, 500, 50, 5 or 0.5 micrometers. In embodiments, the suspension aid 5 consists of or consists essentially of the graphene 10 (e.g., the BRG).

Due to the suspension provided by the suspension aid 5 comprising graphene 10, the suspended particulates 30 can remain suspended in the composition 50 for a longer time than in a same composition absent the suspension aid 5 comprising the graphene 10. For example, in embodiments, the particulate 30 remains suspended in composition 50 during free fluid testing (e.g., with little or substantially no sediment formation/separation), as measured according to API 10B-2, for at least 60, 120, 150, or 200 minutes.

As noted hereinabove, in embodiments, the composition 50 comprises a cement slurry composition 50. Reference to "cement slurry" can indicate an unset cement slurry that has not yet hardened to a hardened cement, such as a recently mixed cement slurry. In such applications, the particulate 30 can comprises a cementitious material particulate 30, such as, without limitation, a Portland cement, such as, for example, a Type I, IA, II, IIA, III, IIIA, IV, V, VI, or VII Portland cement, a subtype thereof, or a combination thereof. In embodiments, the cementitious particulate material 30 comprises a construction grade (e.g., non-API) cement, as described herein. The construction grade cement can be a cement comprising greater than about 1 weight percent (wt %) calcium aluminate (C3A). In embodiments, the cementitious particulate material 30 comprises an API grade cement (e.g., API grade A, B, C, D, E, F, G, H, K, or L cement).

Also disclosed herein is a method of using the composition 50 of this disclosure, for example, to suspend particulates 30 in a composition 50. Such a method will now be described with reference to FIG. 3, which is a schematic flow diagram of a method 200, according to embodiments of this disclosure. Method 200 comprises: combining, at 210, the particulates 30 with a carrier fluid comprising water 20 and a suspension aid 5 comprising graphene 10 to provide a composition 50 comprising an aqueous suspension of the particulates 30 in the carrier fluid comprising water 20. In embodiments, the suspension aid 5 comprising graphene (e.g., BRG) 10 can be combined to form a mix water 40, which mix water 40 can be combined with particulates 30 to provide the composition 50, as described hereinabove with reference to FIG. 2.

The composition 50 can be a composition 50 as described hereinabove with reference to FIG. 1 and/or made as described hereinabove with reference to FIG. 2, wherein the composition 50 comprises suspension aid 5 comprising graphene 10 (e.g., BRG), a particulate material (e.g., a cementitious particulate material) 30, and water 20. The composition 50 can provide enhanced suspension of the particulates 30 relative to a same composition absent the suspension aid 5 comprising graphene 10. For example, the composition 50 can have enhanced suspension, as evidenced by the suspended particulates 30 remain suspended in the composition 50 during free fluid testing (e.g., with little or no sediment formation/separation), as measured according to API 10B-2, for at least 60, 120, 150, or 200 minutes relative to a same composition 50 absent the suspension aid 5 comprising graphene 10.

As noted above, the particulate 30 can comprise sand, a weighting agent, rubber particles, a mechanical property modifier, iron oxide, polymer particles, glass spheres (e.g., hollow glass spheres), a pozzolanic material, a lost circulation material, another non-water soluble particle, a cementitious particulate material, or a combination thereof. The particulate 30 can have a density of greater than or less than water (e.g., 1 g/cm$^3$). In embodiments, the particulate 30 can have an average diameter of less than or equal to about 5000, 500, 50, 5 or 0.5 micrometers. As noted hereinabove, the suspension aid 5 can comprise, consist of or consist essentially of the graphene (e.g., BRG). The composition 50 can comprise greater than or equal to 5, 10, or 20 percent graphene (e.g., BRG) by weight of water (% BRG bwow).

As detailed hereinabove, the graphene 10 can comprise bioderived renewable graphene (BRG), such as graphene 10 derived from a plant, such as, without limitation, the cassava plant. The BRG can comprise graphene with a fused sheet-like morphology (e.g., graphene nanosheets), in embodiments. Such BRG is described in U.S. Patent Publication No. 2021/0061661, U.S. Patent Publication No. 2021/0238040, and U.S. Patent Publication No. 2019/0144280, which are incorporated herein by reference hereinabove.

As noted hereinabove, the composition 50 can comprise from about 0.01 to about 20, from about 0.1 to about 15, from about 0.5 to about 5, or greater than or equal to about 0, 0.1, or 0.5 and less than or equal to about 20, 15, or 5 percent graphene (e.g., BRG) by weight of composition 50 (% graphene (e.g., BRG) bwoc).

As noted above, in embodiments, the particulate 30 comprises a cementitious particulate material 30, such as a Portland cement, such as a Type I, IA, II, IIA, III, IIIA, IV, V, VI, or VII Portland cement, a subtype thereof, or a combination thereof. In embodiments, the composition 50 comprises a cementitious particulate material 30 comprising a construction grade (e.g., non-API) cement, wherein a construction grade cement is a cement comprising greater than about 1 wt % calcium aluminate (C3A). In embodiments, the cementitious particulate material 30 comprises an API grade cement (e.g., API grade A, B, C, D, E, F, G, H, K, or L cement).

A method of this disclosure (e.g., method 100 of FIG. 2 or method 200 of FIG. 3) can further include placing the composition in a workspace. The workspace can comprise an oilwell workspace, such as, for example and without limitation, a subterranean workspace, such as a wellbore. In embodiments, the workspace comprises a non-oilwell workspace, such as, for example and without limitation, a construction site, roadway repair, tunnel/mining, bridges, etc.

By way of non-limiting example, the exemplary compositions 50 disclosed herein may be employed in an oilwell workspace. For example, a composition 50 can be deployed at the workspace via any methods known in the art and with the help of this disclosure. For example, composition 50 can be introduced downhole via a cementing apparatus.

Figure 4:
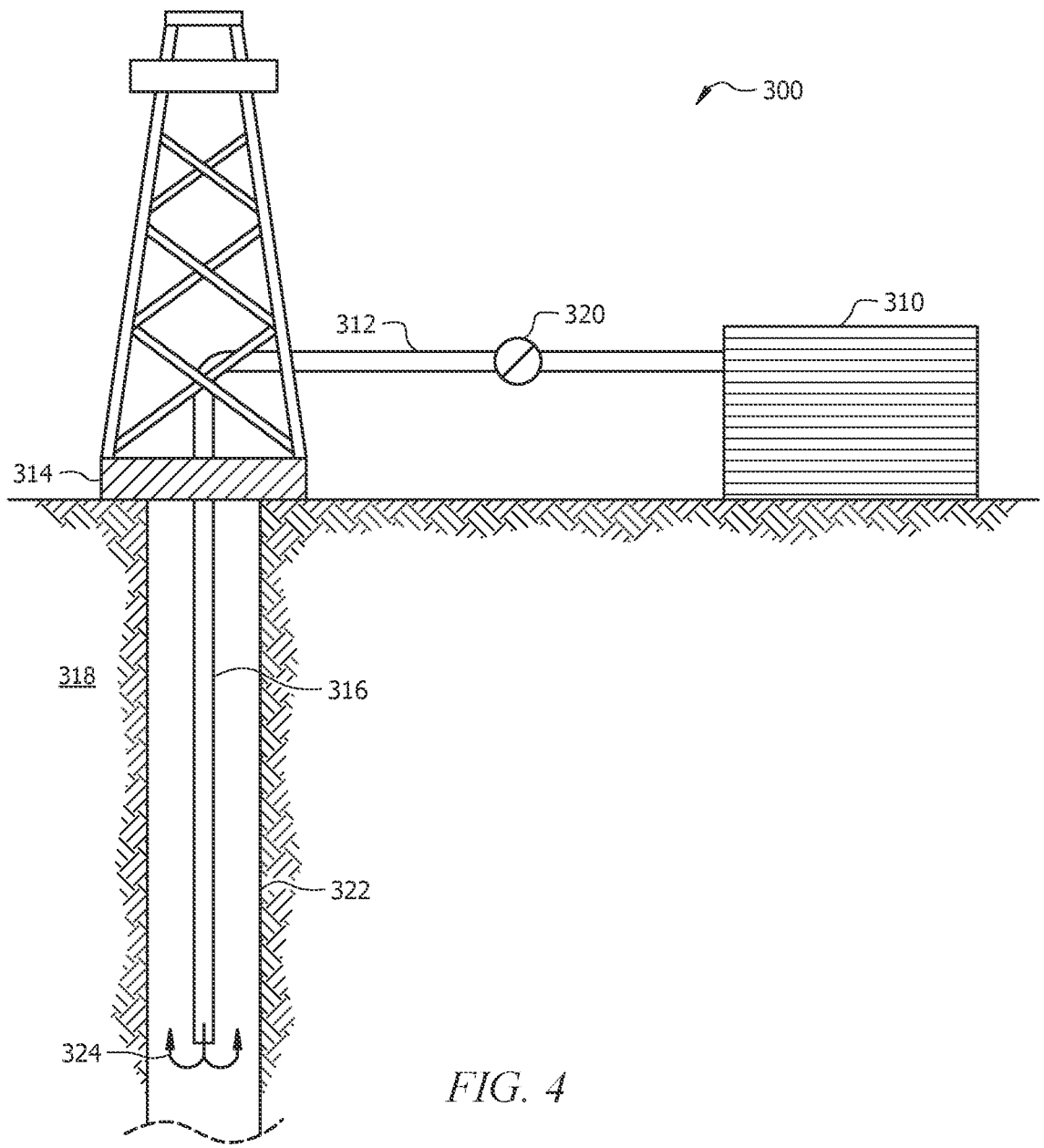
FIG. 4 is a schematic of a cementing workspace, according to embodiments of this disclosure.

FIG. 4 shows an illustrative schematic of cementing workspace or system 300 that can deliver final composition 50 of the present disclosure to a downhole location, according to one or more embodiments. It should be noted that while FIG. 4 generally depicts a land-based system, it is to be recognized that like systems may be operated in subsea locations as well. As depicted in FIG. 4, system 300 may include mixing tank 310, in which a composition 50 (e.g., cement slurry) of the present disclosure may be formulated. Again, in some embodiments, the mixing tank 310 may represent or otherwise be replaced with a transport vehicle or shipping container configured to deliver or otherwise convey the final composition 50 to the well site. The final composition 50 may be conveyed via line 312 to wellhead 314, where the final composition 50 enters tubular 316 (e.g., a casing, drill pipe, production tubing, coiled tubing, etc.), tubular 316 extending from wellhead 314 into wellbore 322 penetrating subterranean formation 318. Upon being ejected from tubular 316, the final composition 50 may subsequently return up the wellbore in the annulus between the tubular 316 and the wellbore 322 as indicated by flow lines 324. In other embodiments, the composition 50 may be reverse pumped down through the annulus and up tubular 316 back to the surface, without departing from the scope of the disclosure. Pump 320 may be configured to raise the pressure of the composition 50 to a desired degree before its introduction into tubular 316 (or annulus). It is to be recognized that system 300 is merely exemplary in nature and various additional components may be present that have not necessarily been depicted in FIG. 4 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like. Moreover, reverse cementing, where the composition is directly placed in the annulus between the tubular 316 and the wellbore 322 may also be performed in accordance with the embodiments described herein, without departing from the present disclosure.

One skilled in the art, with the benefit of this disclosure, should recognize the changes to the system described in FIG. 4 to provide for other cementing operations squeeze operations, reverse cementing (where the cement is introduced into an annulus between a tubular and the wellbore and returns to the wellhead through the tubular), and the like.

It is also to be recognized that the disclosed compositions 50 may also directly or indirectly affect the various downhole equipment and tools that may come into contact with the composition 50 during operation. Such equipment and tools may include, but are not limited, to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), wellbore projectiles (e.g., wipers, plugs, darts, balls, etc.), logging tools and related telemetry equipment, actuators (e.g., electromechanical devices, hydromechanical devices, etc.), sliding sleeves, production sleeves, plugs, screens, filters, flow control devices inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 4.

In embodiments, the composition 50 comprises a cement slurry composition 50, and, upon setting, the hardened cement (also referred to herein as a "set" cement) can have a compressive strength, a tensile strength, a Young's modulus, a Poisson's ratio, or a combination thereof that is at least as high as a compressive strength, a tensile strength, a Young's modulus, a Poisson's ratio, or a combination thereof of a hardened cement produced from a same cement slurry composition absent the graphene (e.g., absent the BRG) and optionally comprising a different suspension aid.

In embodiments, graphene (e.g., BRG) can be utilized as a cement retarder in a composition 50 of this disclosure, for example, as described in U.S. Patent Publication No. 2024/0059953, entitled, "Graphene As A Cement Retarder", the disclosure of which is hereby incorporated herein in its entirety for purposes not contrary to this disclosure; graphene (e.g., BRG) can be utilized to mitigate transient gels in a composition 50 of this disclosure, for example, as described in U.S. Patent Publication No. 2024/0059955, entitled, "Mitigation of Transient Gels in Cement", the disclosure of which is hereby incorporated herein in its entirety for purposes not contrary to this disclosure; and/or graphene (e.g., BRG) can be utilized to enhance stability and density control in a composition 50 of this disclosure, for example, as described in U.S. Patent Publication No. 2024/0059608, entitled, "Use of Graphene To Enhance Stability and Density Control of Cement Slurries", the disclosure of which is hereby incorporated herein in its entirety for purposes not contrary to this disclosure.

Graphene is an odorless black powder comprised of nano-platelets. It is very light and flowable, disperses well into water, and can be utilized as described herein to form fluids capable of suspending solid particulates. A composition 50 comprising a liquid particulate suspension made with graphene 10, as per this disclosure, can provide numerous advantages in oil field and non-oil field applications, which advantages will be apparent to one of skill in the art and with the help of this disclosure.

Graphene suspends very well in water to form a highly thixotropic fluid, making it a unique, non-polymer and non-clay, fluid property modifier that can be utilized as described herein to replace, for example, biopolymers to create suspensions of water insoluble particles 30.

Since graphene 10 does not bio-degrade like biopolymers do, replacing biopolymers in liquid suspension products, as detailed herein, can be operationally friendly and can lead to lower costs (e.g., cost of goods sold (COGS) and/or total costs of operation (TCO)). Due to the non-degradable property of graphene 10, the herein disclosed system will not, in embodiments, require any biocide and will thus be easier to formulate for long shelf life. In embodiments, therefore, the composition 50 of this disclosure comprises no added biocide. Furthermore, liquid particulate suspensions or compositions 50 formed with graphene 10, as described herein, can be marketed as dual functional products, e.g., for delivery of the particulate 30 in liquid form (also referred to herein as a "liquid particulate") for a specific function, along with mechanical property enhancement, in embodiments. In embodiments, this can allow the products to be sold at a higher price for increased profits or as a product differentiator to gain market share.

Other advantages will be apparent to those of skill in the art and with the help of this disclosure.

EXAMPLES

The embodiments having been generally described, the following examples are given as particular examples to demonstrate the practice and advantages of this disclosure. It is understood that the examples are given by way of illustration and are not intended to limit the specification or the claims in any manner.

Example 1: Suspension of Crystalline Silica for Strength Retrogression Mitigation Applications To exemplify the suspension properties of graphene 10 in water 20, three mixtures were first prepared following the formulations depicted in Table 1.

TABLE 1

Formulations for Three Different Graphene/Water Mixtures

| Graphene Concentration | Material | Weight (g) |
|---|---|---|
| 20% bwow | Graphene | 60.0 |
| | Water | 300.0 |
| 10% bwow | Graphene | 30.0 |
| | Water | 300.0 |
| 5% bwow | Graphene | 15.0 |
| | Water | 300.0 |

To form suspensions of solid particulate 30, the graphene 10/water 20 mixtures from Table 1 were combined with crystalline silica sand particulate 30 in a 50:50 ratio. The formulations for these suspensions 50 are shown in Table 2.

TABLE 2

Formulations of Silica Sand in Graphene/Water Mixtures

| Sample | Materials | Weight | Activity (mass %) |
|---|---|---|---|
| A | 20% bwow Graphene/Water Mixture | 150.0 | 16.67 |
| | Crystalline Silica Sand | 150.0 | 50 |
| B | 10% bwow Graphene/Water Mixture | 150.0 | 9 |
| | Crystalline Silica Sand | 150.0 | 50 |
| C | 5% bwow Graphene/Water Mixture | 150.0 | 4.7 |
| | Crystalline Silica Sand | 150.0 | 50 |

For stability testing, each of the three samples, Sample A, Sample B, and Sample C, were poured into separate 100 ml graduated cylinders up to the 100 mL mark. The samples were then allowed to rest on the benchtop (at room temperature and pressure) for two hours. After the two hour mark, the observations shown in Table 3 were made.

TABLE 3

Free Fluid and Observation Noted During Stability Tests

| Sample | Free Fluid (mL) | Comments |
|---|---|---|
| A | 0.0 | No separation or settling observed. Significant structure but pourable. |
| B | 1.0 | Very slight settling and no separation observed. Noticeable structure but easily flowable. |
| C | 10.0 | Some settling and no separation observed. Visible structure but thin. |

Figure 5A:
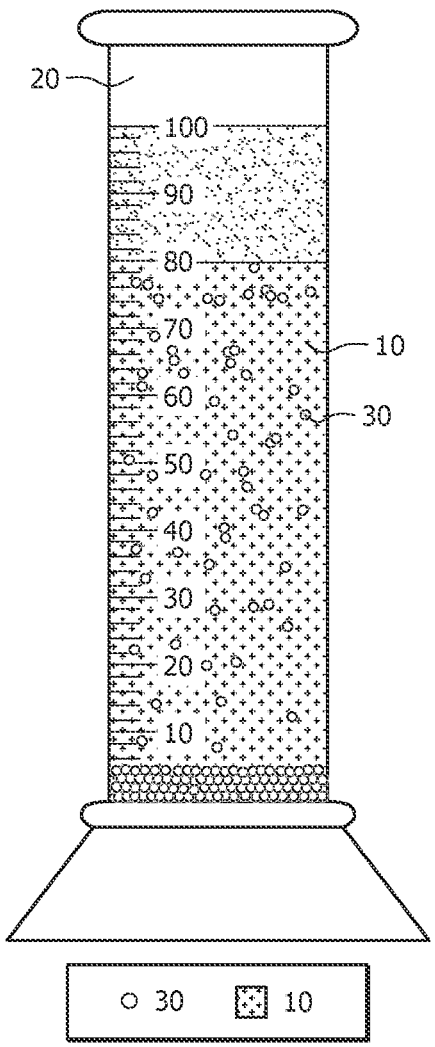
FIG. 5(a) and FIG. 5(b) are schematics of settling samples in Example 1.
Figure 5B:
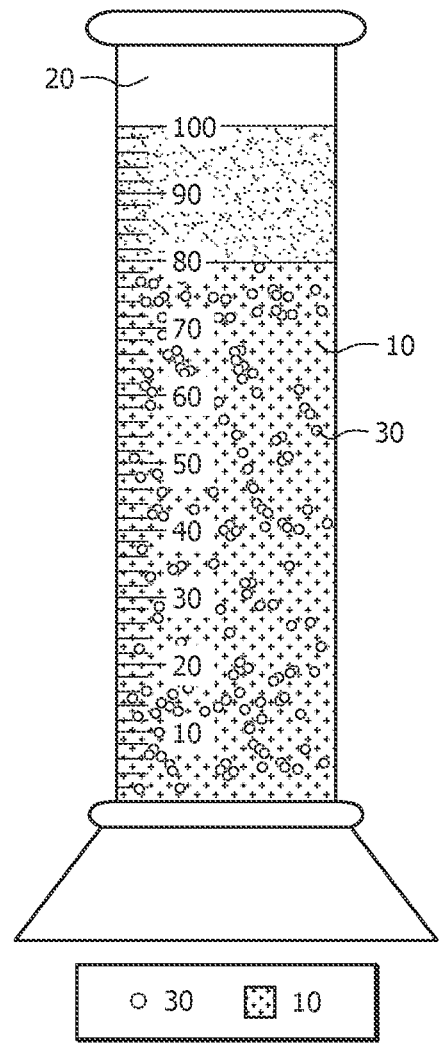

As can be seen in Table 3, the graphene 10 provided enough suspension capability to suspend crystalline silica particles 30 which have a specific gravity (SG) of 2.65 and PSD $D_{50}$ of 24 microns. Unexpectedly, it was also observed that in the samples where slight or some settling was observed the graphene 10 and sand 30 acted as a single layer, i.e. there was no separation of the silica sand particulate 30 from the graphene 10. This novel phenomenon will now be described with reference to FIG. 5(a) and FIG. 5(b), which are schematics of settling samples, as per this Example 1. FIG. 5(a) shows the expected result of settling, while FIG. 5(b) depicts the unexpectedly observed result. FIG. 5(a) is a schematic representation of what would normally be expected of a suspending aid that is settling out of water and failing to suspend the silica sand particles 30. FIG. 5(b) is a representation of what was actually observed in this Example 1. Surprisingly, although the graphene 10 suspending aid 5 was itself settling out of the water 20, the silica sand particles 30 remained well dispersed within the graphene 10 containing suspending aid 5, and apparently only settled as much as the graphene 10.

Example 2: Suspension of Heavy-Weight Additive

Graphene 10 suspending aid 5 is also able to suspend heavy-weight particles 30, such as iron oxide (SG=5.02 and PSD $D_{50}$ of about 50 microns). In this Example 2, three mixtures were prepared following the formulations shown in Table 4.

TABLE 4

Formulations for Three Different Graphene/Water Mixtures

| Graphene Concentration | Material | Weight (g) |
|---|---|---|
| 20% bwow | Graphene | 30.0 |
| | Water | 150.0 |
| 10% bwow | Graphene | 15.0 |
| | Water | 150.0 |
| 5% bwow | Graphene | 7.5 |
| | Water | 150.0 |

To form suspensions of solid particulate 30 comprising iron oxide, the graphene/water mixtures from Table 4 were combined with iron oxide in a 50:50 weight ratio. The formulations for these suspensions 50 are shown in Table 5.

TABLE 5

Formulations of Iron Oxide in Graphene/Water Mixtures

| Sample | Materials | Weight (g) | Activity (mass %) |
|---|---|---|---|
| D | 20% bwow Graphene/Water Mixture | 150.0 | 16.67 |
| | Iron Oxide Particles | 150.0 | 50 |
| E | 10% bwow Graphene/Water Mixture | 150.0 | 9 |
| | Iron Oxide Particles | 150.0 | 50 |
| F | 5% bwow Graphene/Water Mixture | 150.0 | 4.7 |
| | Iron Oxide Particles | 150.0 | 50 |

For stability testing, each of the three samples (Sample D, Sample E, Sample F) were poured into separate 100 mL graduated cylinders up to the 100 mL mark. The samples were then allowed to rest on the benchtop (at room temperature and pressure) for two hours. After the two hour mark, the observations shown in Table 6 were made.

TABLE 6

Free Fluid and Observation Noted During Stability Tests

| Sample | Free Fluid (mL) | Comments |
|---|---|---|
| D | 0.0 | No separation or settling observed. Significant structure but pourable. |
| E | 2.0 | Very slight settling and no separation observed. Noticeable structure but easily flowable. |
| F | 30.0 | Some settling and no separation observed. Visible structure but thin. |

As can be seen in Table 6, the graphene 10 provided sufficient suspension capabilities to suspend iron oxide particles 30 which have a specific gravity (SG) of 5.02. Similar to the silica sand experiments, it was also observed that in the samples where slight or some settling was observed the graphene 10 and iron oxide particulate 30 acted as a single layer and there was no separation of the iron oxide particulates 30 from the graphene 10.

Example 3: Suspension of Light-Weight Additive

Graphene 10 suspending aid 5 is also able to suspend light-weight polymeric particles 30, which would normally float on the water 20. The light-weight particles 30 tested in this Example 3 had an SG=0.97 with a PSD $D_{50}$ of about 500 microns. Three mixtures were prepared following the formulations below in Table 7.

TABLE 7

Formulations for Three Different Graphene/Water Mixtures

| Graphene Concentration | Material | Weight (g) |
|---|---|---|
| 20% bwow | Graphene | 30.0 |
|  | Water | 150.0 |
| 10% bwow | Graphene | 15.0 |
|  | Water | 150.0 |
| 5% bwow | Graphene | 7.5 |
|  | Water | 150.0 |

To form suspensions of the polymer particulates 30, the polymer particulates 30 were combined with the graphene 10/water 20 mixtures from Table 7 in a 1:3 weight ratio. The formulations for these suspensions are shown in Table 8.

TABLE 8

Formulations of Polymer Particles in Graphene/Water Mixtures

| Sample | Materials | Weight (g) | Activity (mass %) |
|---|---|---|---|
| G | 20% bwow Graphene/Water Mixture | 150.0 | 16.67 |
|  | Polymer Particles | 50.0 | 50 |
| H | 10% bwow Graphene/Water Mixture | 150.0 | 9 |
|  | Polymer Particles | 50.0 | 50 |
| I | 5% bwow Graphene/Water Mixture | 150.0 | 4.7 |
|  | Polymer Particles | 50.0 | 50 |

For stability testing, each of the three samples (Sample G, Sample H, Sample 1) was poured into a separate 100 mL graduated cylinder up to the 100 mL mark. The samples were then allowed to rest on the benchtop (at room temperature and pressure) for two hours. After the two hour mark, the observations shown in Table 9 were made.

TABLE 9

Free Fluid and Observation Noted During Stability Tests

| Sample | Free Fluid (mL) | Comments |
|---|---|---|
| G | 0.0 | No separation or settling observed. Significant structure but pourable. |
| H | 1.0 | Very slight settling and no separation observed. Noticeable structure but easily flowable. |
| I | 30.0 | Some settling and no separation observed. Visible structure but thin. |

As can be seen in Table 9, the graphene 10 provided enough suspension capability to suspend the polymer particles 30. Similar to the silica sand experiments (but with floating instead of settling), it was also observed that, in the samples where slight or some settling was observed, the graphene 10 and polymer particles 30 acted as a single layer, and there was no separation from the graphene 10 and the mixture remained continuous throughout although floating on the water 20.

Additional Disclosure

The following are non-limiting, specific embodiments in accordance with the present disclosure:

In a first embodiment, a composition comprises: a particulate; water; and a suspension aid comprising graphene, wherein the graphene comprises bioderived renewable graphene (BRG), wherein the particulate is suspended in the composition.

A second embodiment can include the composition of the first embodiment, wherein the graphene comprises bio-derived renewable graphene (BRG).

A third embodiment can include the composition of the second embodiment, wherein the BRG comprises graphene derived from a plant.

A fourth embodiment can include the composition of the third embodiment, wherein the plant comprises cassava.

A fifth embodiment can include the composition of any one of the second to fourth embodiments, wherein the BRG comprises graphene a fused sheet-like morphology.

A sixth embodiment can include the composition of any one of the first to fifth embodiments, wherein the particulate comprises sand, a weighting agent, rubber particles, a mechanical property modifier, iron oxide, polymer particles, glass spheres (e.g., hollow glass spheres), a pozzolanic material, a lost circulation material, water insoluble particles, or a combination thereof.

A seventh embodiment can include the composition of any one of the first to sixth embodiments, wherein the particulate has a density of greater than, equal to, or less than water.

An eighth embodiment can include the composition of any one of the first to seventh embodiments, wherein the suspension aid consists of or consists essentially of the BRG.

A ninth embodiment can include the composition of any one of the first to eighth embodiments, comprising greater than or equal to 5, 10, or 25 percent BRG by weight of water (% BRG bwow).

A tenth embodiment can include the composition of any one of the first to ninth embodiments, wherein the particulate has an average diameter of less than or equal to about 5000, 500, 50, 5 or 0.5 micrometers.

An eleventh embodiment can include the composition of any one of the first to tenth embodiments, wherein the suspended particulates remain suspended in the composition during free fluid testing, as measured according to API 10B-2, for at least 60, 120, 150, or 200 minutes.

A twelfth embodiment can include the composition of the eleventh embodiment, wherein the BRG and the particulate remains homogeneously dispersed during the free fluid testing.

In a thirteenth embodiment a method of making a composition comprising suspended particulates comprises: combining a suspension aid and water to form a mix water, wherein the suspension aid comprises graphene, wherein the graphene comprises bioderived renewable graphene (BRG); combining the mix water with the particulate to provide the composition having the particulates suspended therein; and placing the composition in a workspace.

A fourteenth embodiment can include the method of the thirteenth embodiment, wherein the suspended particulates remain suspended in the composition during free fluid testing, as measured according to API 10B-2, for at least 60 minutes.

A fifteenth embodiment can include the method of the fourteenth embodiment, wherein the BRG comprises graphene derived from a plant.

A sixteenth embodiment can include the method of the fifteenth embodiment, wherein the plant comprises cassava.

A seventeenth embodiment can include the method of any one of the fourteenth to sixteenth embodiments, wherein the BRG comprises graphene with a fused sheet-like morphology.

An eighteenth embodiment can include the method of any one of the thirteenth to seventeenth embodiments, wherein the particulate comprises sand, a weighting agent, rubber particles, a mechanical property modifier, iron oxide, polymer particles, glass spheres (e.g., hollow glass spheres), a pozzolanic material, a lost circulation material, another water insoluble particle, or a combination thereof.

A nineteenth embodiment can include the method of any one of the thirteenth to eighteenth embodiments, wherein the particulate has a density of greater than or less than water.

A twentieth embodiment can include the method of any one of the thirteenth to nineteenth embodiments, wherein the suspension aid consists of or consists essentially of the BRG.

A twenty first embodiment can include the method of any one of the thirteenth to twentieth embodiments, wherein the composition comprises greater than or equal to 5, 10, or 25 percent BRG by weight of water (% BRG bwow).

A twenty second embodiment can include the method of any one of the thirteenth to twenty first embodiments, wherein the particulate has an average diameter of less than or equal to about 5000, 500, 50, 5 or 0.5 micrometers.

A twenty third embodiment can include the method of any one of the thirteenth to twenty second embodiments, wherein the suspended particulates remain suspended in the composition during free fluid testing, as measured according to API 10B-2, for at least 60, 120, 150, or 200 minutes.

In a twenty fourth embodiment, a method of suspending particulates comprises: combining the particulates with a carrier fluid comprising water and a suspension aid comprising graphene to provide an aqueous suspension of the particulates in the carrier fluid, wherein the graphene comprises bioderived renewable graphene (BRG).

A twenty fifth embodiment can include the method of the twenty fourth embodiment, wherein the graphene comprises graphene with a fused sheet-like morphology.

A twenty sixth embodiment can include the method of the twenty fifth embodiment, wherein the BRG comprises graphene derived from a plant.

A twenty seventh embodiment can include the method of the twenty sixth embodiment, wherein the plant comprises cassava.

A twenty eighth embodiment can include the method of any one of the twenty fifth to twenty seventh embodiments, wherein the BRG comprises graphene with a fused sheet-like morphology.

A twenty ninth embodiment can include the method of any one of the twenty fourth to twenty eighth embodiments, wherein the particulate comprises sand, a weighting agent, rubber particles, a mechanical property modifier, iron oxide, polymer particles, glass spheres (e.g., hollow glass spheres), a pozzolanic material, a lost circulation material, another non-water soluble particle, or a combination thereof.

A thirtieth embodiment can include the method of any one of the twenty fourth to twenty ninth embodiments, wherein the particulate has a density of greater than or less than water.

A thirty first embodiment can include the method of any one of the twenty fourth to thirtieth embodiments, wherein the suspension aid consists of or consists essentially of the BRG.

A thirty second embodiment can include the method of any one of the twenty fourth to thirty first embodiments, wherein the aqueous suspension comprises greater than or equal to 5, 10, or 20 percent BRG by weight of water (% BRG bwow).

A thirty third embodiment can include the method of any one of the twenty fourth to thirty second embodiments, wherein the particulate has an average diameter of less than or equal to about 5000, 500, 50, 5 or 0.5 micrometers.

A thirty fourth embodiment can include the method of any one of the twenty fourth to thirty third embodiments, wherein the suspended particulates remain suspended in the composition during free fluid testing, as measured according to API 10B-2, for at least 60, 120, 150, or 200 minutes.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, R1, and an upper limit, Ru, is disclosed, any number falling within the range is specifically disclosed. In particular, the following numbers within the range are specifically disclosed: R=R1+k*(Ru−R1), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of making a composition comprising suspended particulates, the method comprising:
    combining a suspension aid and water to form a mix water, wherein the suspension aid comprises graphene, wherein the graphene comprises bioderived renewable graphene (BRG);
    combining the mix water with the particulate to provide the composition having the particulates suspended therein; and
    placing the composition in a workspace,
    wherein the suspended particulates remain suspended in the composition during free fluid testing, as measured according to API 10B-2, for at least 60 minutes, and
    wherein the composition comprises greater than or equal to 5 percent BRG by weight of water (% BRG bwow).

2. The method of claim 1, wherein the BRG comprises graphene derived from a plant.

3. The method of claim 1, wherein the BRG comprises graphene with a fused sheet-like morphology.

4. The method of claim 1, wherein the particulate comprises sand, a weighting agent, rubber particles, a mechanical property modifier, iron oxide, polymer particles, glass spheres, a pozzolanic material, a lost circulation material, another water insoluble particle, or a combination thereof.

5. The method of claim 1, wherein the suspension aid consists essentially of the BRG.

6. The method of claim 1, wherein the composition comprises greater than or equal to 10 percent BRG by weight of water (% BRG bwow).

7. The method of claim 1, wherein the plant comprises cassava.

8. The method of claim 1, wherein the particulate has a density of greater than water.

9. The method of claim 1, wherein the particulate has an average diameter of less than or equal to about 5000 micrometers.

10. The method of claim 1, wherein the suspended particulates remain suspended in the composition during free fluid testing, as measured according to API 10B-2, for at least 120 minutes.

11. A method of suspending particulates, the method comprising:
    combining the particulates with a carrier fluid comprising water and a suspension aid comprising graphene to provide an aqueous suspension of the particulates in the carrier fluid, wherein the graphene comprises bioderived renewable graphene (BRG), and wherein the suspended particulates remain suspended in the aqueous suspension during free fluid testing, as measured according to API 10B-2, for at least 60 minutes, and wherein the aqueous suspension comprises greater than or equal to 5 percent BRG by weight of water (% BRG bwow).

12. The method of claim 11, wherein the graphene comprises graphene with a fused sheet-like morphology.

13. The method of claim 11, wherein the BRG comprises graphene derived from a plant.

14. The method of claim 11, wherein the particulate comprises sand, a weighting agent, rubber particles, a mechanical property modifier, iron oxide, polymer particles, glass spheres, a pozzolanic material, a lost circulation material, another non-water soluble particle, or a combination thereof.

15. The method of claim 11, wherein the suspension aid consists of or consists essentially of the BRG.

16. The method of claim 11, wherein the aqueous suspension comprises greater than or equal to 15 percent BRG by weight of water (% BRG bwow).

17. The method of claim 11, wherein the plant comprises cassava.

18. The method of claim 11, wherein the particulate has a density of less than water.

19. The method of claim 11, wherein the aqueous suspension comprises greater than or equal to 10 percent BRG by weight of water (% BRG bwow).

20. The method of claim 11, wherein the particulate has an average diameter of less than or equal to about 500 micrometers.

* * * * *